(12) United States Patent
Bieberdorf

(10) Patent No.: US 6,685,333 B1
(45) Date of Patent: Feb. 3, 2004

(54) ADJUSTABLE EXTENSION FOR AIRPORT LIGHT BASE

(76) Inventor: Roger Bieberdorf, 3060 Ridgecrest, No. 115, Mesa, AZ (US) 85207

( * ) Notice: Subject to any disclaimer, the term of this patent is extended or adjusted under 35 U.S.C. 154(b) by 0 days.

(21) Appl. No.: 10/161,846

(22) Filed: Jun. 4, 2002

Related U.S. Application Data

(60) Provisional application No. 60/297,212, filed on Jun. 7, 2001.

(51) Int. Cl.[7] .................................................. E01F 9/00
(52) U.S. Cl. ..................... 362/153.1; 362/365; 362/366; 362/430; 404/26; 52/28
(58) Field of Search .............................. 362/153, 153.1, 362/285, 365, 366, 430; 404/26; 220/8; 52/28

(56) References Cited

U.S. PATENT DOCUMENTS 5,450,300 A * 9/1995 Rector, Jr. ................ 362/153.1
5,779,349 A   7/1998 Reinert
6,113,245 A * 9/2000 Reinert, Sr. .............. 362/153.1

* cited by examiner

Primary Examiner—Stephen Husar
(74) Attorney, Agent, or Firm—Parsons & Golstry; Michael W. Goltry; Robert A. Parsons

(57) ABSTRACT

This invention relates to height adjustable extensions of in-ground containers for embedded container light supports in airport runways. The apparatus has a first and second telescoping tube, each having a wall terminating in a flange. The flange on its upper end is for the reception of a light fixture, and the flange at the bottom end has bolt holes registering with the flange on the upper end of the in-ground container. There are a plurality of tapped bores in the wall of the outer tube. Set screws in the tapped bores are adapted to bear on the inner tube. The method of extending the height of the lighting fixture container comprises these steps: providing the apparatus as described above, positioning the telescoping tubes at a required height position; tightening the set screws to temporarily preserve the height position; pouring cementitious material around the positioned tubes; and allowing the cementitious material to set to hold said tubes in place.

15 Claims, 6 Drawing Sheets

ADJUSTABLE EXTENSION FOR AIRPORT LIGHT BASE

Applicant claims priority of provisional application No. 60/297,212 filed Jun. 7, 2001.

BACKGROUND OF THE INVENTION

1. Field of the Invention

This invention relates to height adjustable extensions of in-ground containers for embedded container light supports in airport runways.

2. Background of the Invention

The discussion of the prior art in U.S. Pat. 5,779,349, including the disclosures therein which are prior art to this invention, is incorporated herein by reference as though fully set forth herein. Only so much of the background as will be necessary to set the stage for this invention will be repeated herein.

Conventional lighting fixtures forming part of specialized, set-in-the-ground airport runway lighting systems are mounted on steel or non-metalic containers which for airport runway inset lights, can be one-part or two-part and, sometimes, three-part containers set below the surface of runways, taxiways, and other aircraft ground traffic areas. The bottom sections of the containers are sometimes called shallow light bases. The top sections are called fixed-length extensions and are manufactured in varying lengths and diameters. Flat spacer rings are installed between the extensions and the lighting fixtures for providing further height adjustments. These conventional steel containers, in addition to serving as bases for mounting the lighting fixtures, also serve as transformer housings and junction boxes to bring electrical power to the lighting fixtures.

In the installation of airport runways, the bases of one or two-section containers are embedded in the edges of the pavements at the time of initial construction. The top portions of the lighting fixtures are installed at a close tolerance, slightly above the pavement surface. A typical container which varies in length and diameter is made with an inverted flange at the top end. The flange has a standard set of threaded holes to allow for the runway, taxiway, edge, and other light fixtures to be bolted onto them above the pavement surface, or to allow for the top section of the container to be bolted onto the bottom section, if it is a two-section container. Most existing, conventional containers are two section containers, bolted together at their inverted flanges. The light fixture is bolted onto the top inverted flange of the top section of the two-section container.

Installations of the containers and their lighting fixtures are required on two different occasions: At initial construction, and again on resurfacing or repaving. The process of resurfacing (repaving) buries the flanges on the embedded containers under the pavement. Consequently height adjusting devices with flanges identical to those of the embedded containers are used to raise the container to the new surface level so that lighting fixtures can be installed and aligned above the pavement. In many instances, this requires core-drilling the newly poured or placed pavement down to the now buried top flange of the embedded container.

Depending on the lengths of the runways and taxiways, thousands of these embedded containers are affected, and a wide variety of height adjustments can be involved for differing sizes of embedded containers. In such an adjustment system, fixed-length extensions must be made available in many different lengths to provide the required gross height adjustments. A combination of one or more flat spacer rings, which are manufactured in thicknesses of $\frac{1}{16}$, $\frac{1}{8}$, $\frac{1}{4}$, and $\frac{1}{2}$ inch (1.6, 3.2, 6.3, and 12.7 millimeters, approximately), and other thicknesses, can be used to provide the final height.

Typical fixed-length extensions have one inverted flange on each end to bolt onto the embedded container, and then flat rings are added on top of the fixed-length extension top flange to make finer adjustments before the lighting fixture is bolted onto the flange.

The fixed-length extensions and the flat spacer rings must be individually ordered to the required length. This adjustment system makes conventional installation a difficult and tedious procedure involving (1) field measurement of each individual fixed extension length and flat spacer ring required for every container; (2) record keeping of all those field measurements and locations for ordering and verification; (3) ordering, receiving, and delivering to the field each size according to its location; and (4) frequently having to install more than one flat spacer ring to achieve the required height. The listed complications for the difficult conventional installation procedure are further magnified by the fact that the embedded containers are made in 4 different sizes: 10, 12, 15, and 16 inches (25.4, 30.5, 38.1, and 40.6 centimeters, approximately) in diameter.

Remembering that embedded containers below the pavement surface serve as light fixture bases, transformer housings and junction boxes, and depending on the location of these containers, one appreciates that they are exposed to varying degrees and types of forces applied to them by the aircraft and other vehicular traffic in that location. For example, runway and taxiway centerline light fixtures, and the containers they are bolted onto, are subjected to direct aircraft and other heavy vehicular loading applied to the top flange of the container and forces transmitted down to its walls.

The disclosure of U.S. Pat. No. 5,779,349 teaches the use of mating threaded extension to vary the height of the extensions. The disadvantages of the acme thread feature of the prior art are that it requires an extra manufacturing step (which is eliminated by the instant invention) and reduces the diameter of the in-ground container, whereas the present invention maintains the diameter of the in-ground container in the extensions.

SUMMARY OF THE INVENTION

The present invention is a novel extension means for adjusting the height of a previously installed, airport elevated light. The invention is an apparatus for extending the height of an in-ground airport runway lighting system container having a flange on its upper end for reception of a light fixture. The invention has first and second telescoping tubes, each having a wall terminating respectively in a flange at a top end, and a flange at the bottom end. The bottom end flange has bolt holes which register with the flange on the upper end of the in-ground container and the top end is adapted to receiving a lighting fixture. The outer tube has a number of tapped bores. A set screw is inserted into each tapped bore to hold the relative positions of the telescoping tubes until they can be permanently set with concrete, grout, epoxy, or other cementitious substance.

The method of extending the height of an in-ground airport utilizes the following steps:

Provide first and second telescoping tubes as described in the preceding paragraphs. Then position the telescoping tubes at a required height; next tighten the set screws to temporarily preserve the height position; then pour concrete, grout, epoxy, or other cementitious substance around the tubes and allow the concrete, grout, epoxy, or other cementitious substance to set to hold said tubes in place.

The extension is connected to a fixed connecting flange of a conventional, prior art airport elevated light.

BRIEF DESCRIPTION OF THE DRAWINGS

FIG. 1 also shows a concrete encasement and three layers of pavement.

DETAILED DESCRIPTION OF THE DRAWINGS

Figure 1:
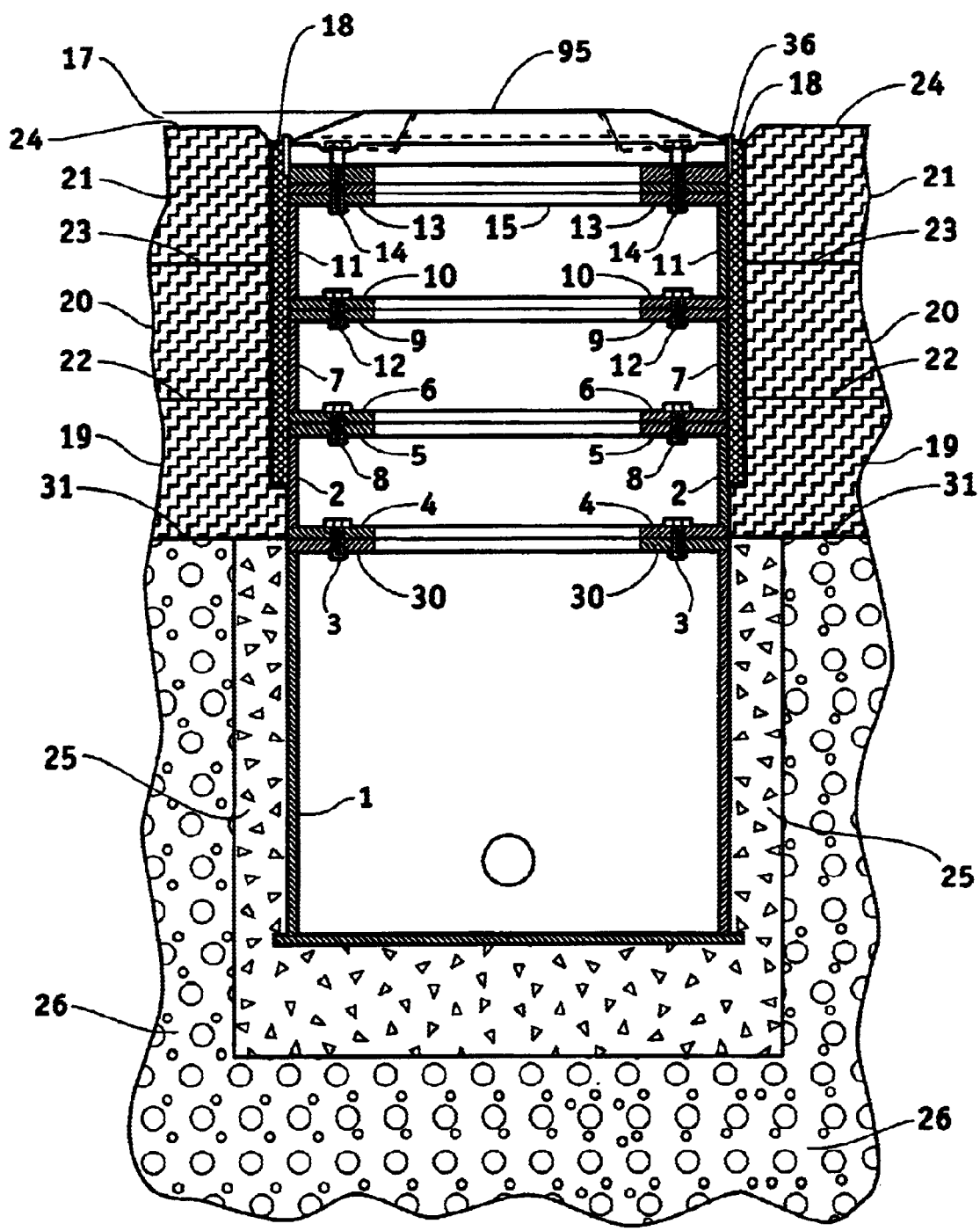
FIG. 1 is an elevation view, partially in section, of the existing fixed-length extensions installed on a conventional prior art embedded container and a lighting fixture installed thereon.
Figure 2:
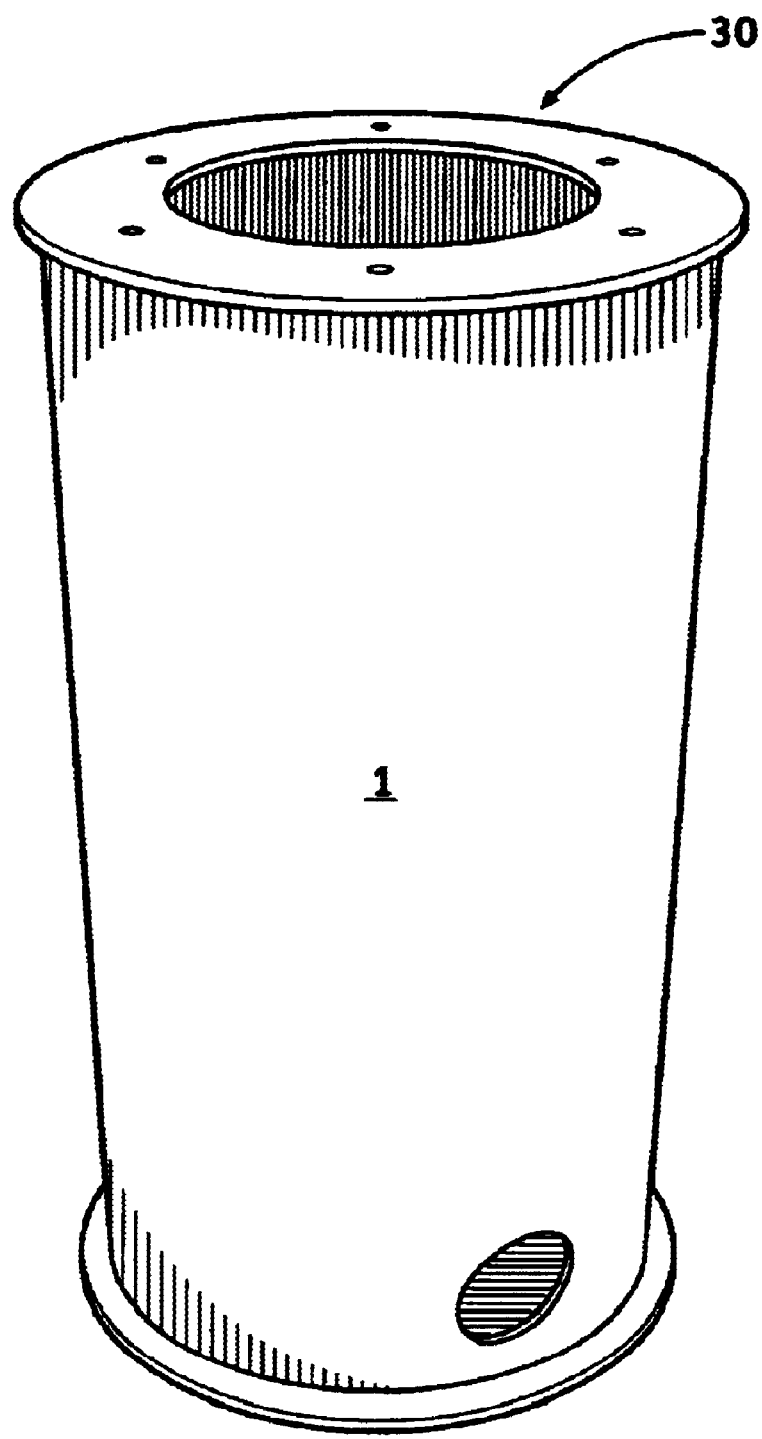
FIG. 2 is a perspective view of a prior art one-piece metal container set in the ground as a base for a light fixture.

Referring now to FIGS. 1 and 2, prior art container 1 is represented schematically with three fixed-length extensions 2, 7, and 11 bolted together. Container 1 is embedded in concrete 25 (or surrounded by native soil) at the time an airport runway, taxiway, and other aircraft ground traffic areas (hereinafter aircraft ground traffic areas) are first built. These ground traffic areas are generally built upon a compacted granular sub-base 26.

Figure 6:
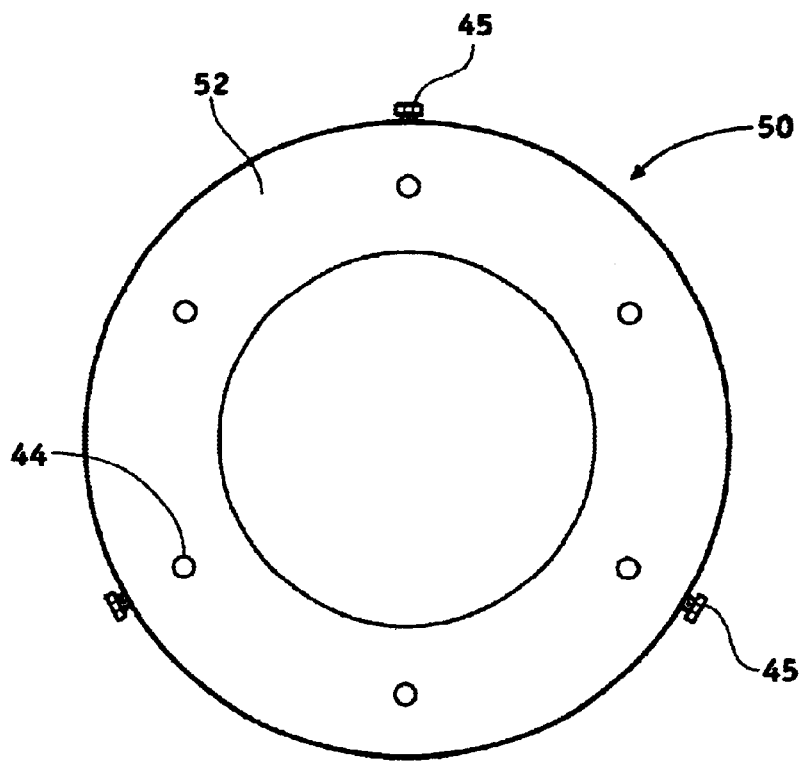
FIG. 6 is a plan view of the top flange of the top section of this invention.
Figure 7:
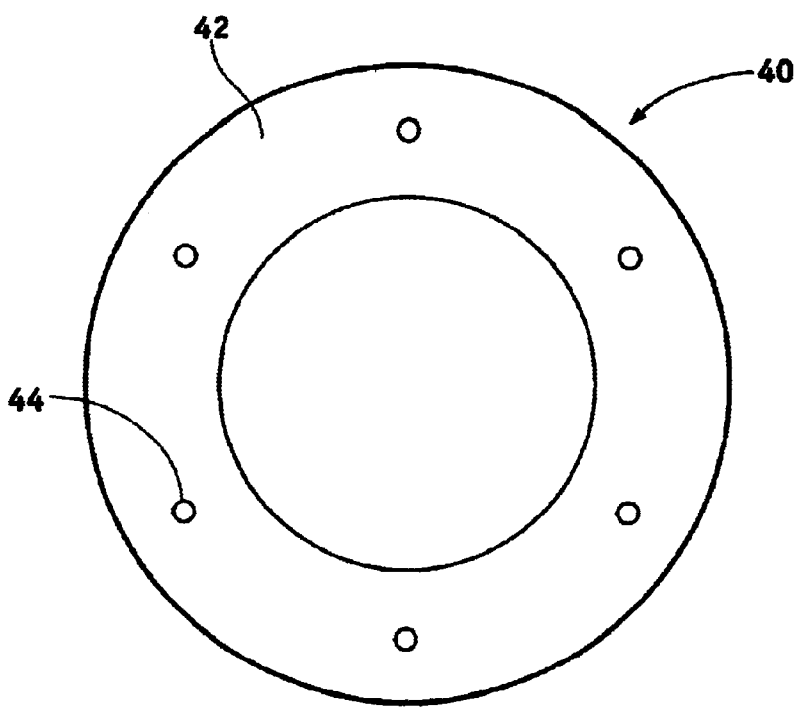
FIG. 7 is a plan view of the bottom flange of the bottom section of this invention.
Figure 8:
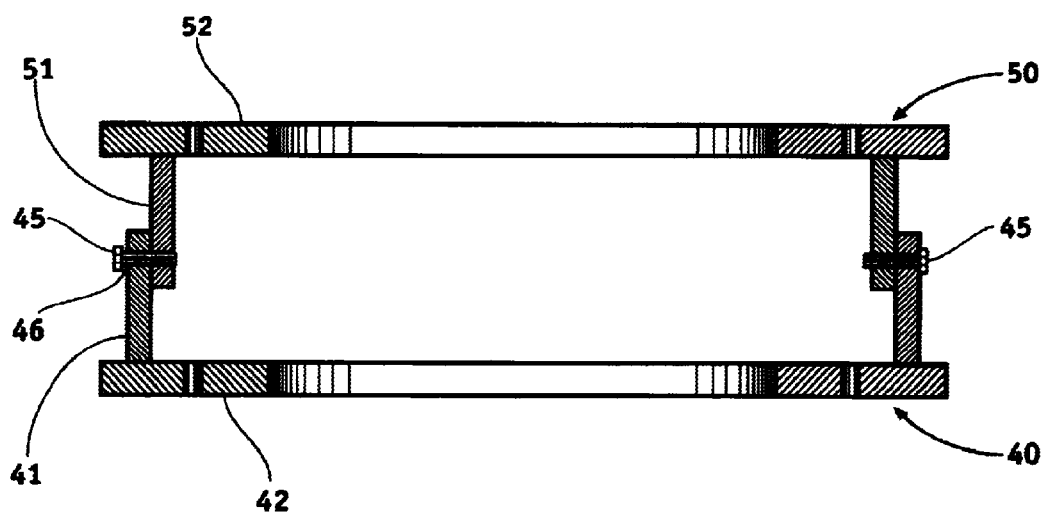
FIG. 8 is a elevation view, in cross-section, of the assembled top and bottom sections of this invention.

Conventional steel containers 1, in addition to serving as bases for mounting airport inset or elevated lighting fixtures 95 also serve as transformer housings and junction boxes to bring electrical power to lighting fixture 95, as shown in FIGS. 1, and 2. Fixed-length extension 2 is bolted to top flange 30 on container 1, which has 6 or 12 threaded bolt holes 44, (depending on whether load-bearing or non load-bearing) as shown in FIGS. 6–8, by means of its bottom flange 4 and bolts 3. Fixed-length extension 2 is bolted to bottom flange 6 of fixed-length extension 7 by means of its top flange 5 and bolts 8. Fixed-length extension 7 is bolted on top of a fixed-length extension 2.

Fixed-length extensions have six or twelve bolt holes in both of their flanges, i.e., top flange-5 and bottom flange 4 of extension 2, as shown in FIG. 1. The bolt holes, not shown, on the top flanges of the extensions are threaded, while the bolt holes, not shown, on the bottom flange are not threaded.

Fixed-length extension 7 is bolted to bottom flange 10 of fixed-length extension 11 by means of its top flange 9 and bolts 12. Fixed-length extension 11 is bolted on top of fixed-length extension 7.

Fixed-length extensions in the prior art provide only a gross height adjustment. One or a plurality of flat spacer rings 15 are required for providing the more precise final height adjustment.

Flat spacer rings 15 are installed on top flange 13 of fixed-length extension 11, as shown in FIG. 1, i.e., the top fixed-length extension, to provide the final height adjustment 17 for lighting fixture 95. Flat spacer rings 15 can be one or more. They are fabricated as thin as 1/16 inch (1.6 mm) and as thick as three-quarters inch (19 mm) or thicker. Mud dam 36, (applies to inset lighting only) as shown in FIG. 1, comes next on top of spacer rings 15. The inset lighting fixture 95 is bolted together with flat spacer rings 15 and mud dam 36 onto the top flange 13 of the top fixed-length extension 11 by means of bolts 14.

Continuing to refer to FIGS. 1 and 2, several layers of pavement 19, 20, 21 are shown, to exemplify the fact that fixed-length extensions 2, 7, and 11 are utilized for height adjustments every time an aircraft ground traffic areas is first built or upgraded by the installation of new pavement, i.e., each new layer of pavement 19, 20, and 21. The new layers create new surfaces 22, 23, and 24 and therefore new heights.

These airport aircraft ground traffic area upgrades create the need for height adjusting devices, with flanges identical to those of the embedded container 1, in order to adapt the container 1 to the new surface, i.e., the new height and further in order for the lighting fixture 95 to be installed slightly above the new pavement surface, i.e., surface 22, 23, or 24, at a close tolerance 17 above new pavement surface 24, for example.

In order to seal pavement layers 19, 20, 21 around container 1, grout, concrete, epoxy, or other cementitious substance 18 is utilized. Conventional pavement rings 36, commonly known in the industry as mud dam (inset lighting only) 36, as shown in FIG. 1, are installed on top of spacer rings 15 to protect lighting fixture 95 from being splashed by the grout 18 at the time of its application.

When any one layer of pavement is first placed, it is done by placing it over the entire surface, i.e., surface 31. Then the pavement 19 is core-drilled at the location of each container 1 to remove the pavement at that location to install fixed-length extension 2, any flat spacer ring 15, mud dam 36, and finally lighting fixture 95 at the new height created by pavement 19 and surface 22, by way of example. This process is repeated every time a new layer of pavement is added, i.e., for further layers 20 and 21. The core drilled hole is larger in diameter than the diameter of container 1, hence the requirement to utilize concrete, grout, epoxy, or other cementitious substance 18 to fill in the void and therefore the need to install a mud dam 36, as shown in FIG. 1, to protect lighting fixture 95, as shown in FIGS. 1, 2 when concrete, grout, epoxy, or other cementitious substance 18 is poured.

A newer method has also been used for aircraft ground traffic area reconstruction, i.e., resurfacing or repaving. Instead of adding a new layer of pavement on top of the last one installed, the last one layer, i.e., pavement layer 21, is milled down by large roto-milling machines.

Prior to roto-milling the pavement top layer, i.e., layer 21, the lighting fixtures, any spacer rings, the mud ring, and the top, existing fixed-length extensions have to be removed. An overlay protection plate, not shown, is bolted to top flange 30, on container 1, to prevent debris from falling into container 1. After roto-milling, a new layer of pavement is installed, and the new pavement is core-drilled at the location of each container 1 to replace the items removed back to their original position. Core drilling at each embedded container location is done to provide access for reinstalling the items previously removed. Nevertheless, in a great percentage of the cases, i.e., at each of the individual container locations, differences of height occur, creating the need for installation of additional flat spacer rings 15 on top of the ones removed and being reinstalled.

Figure 3:
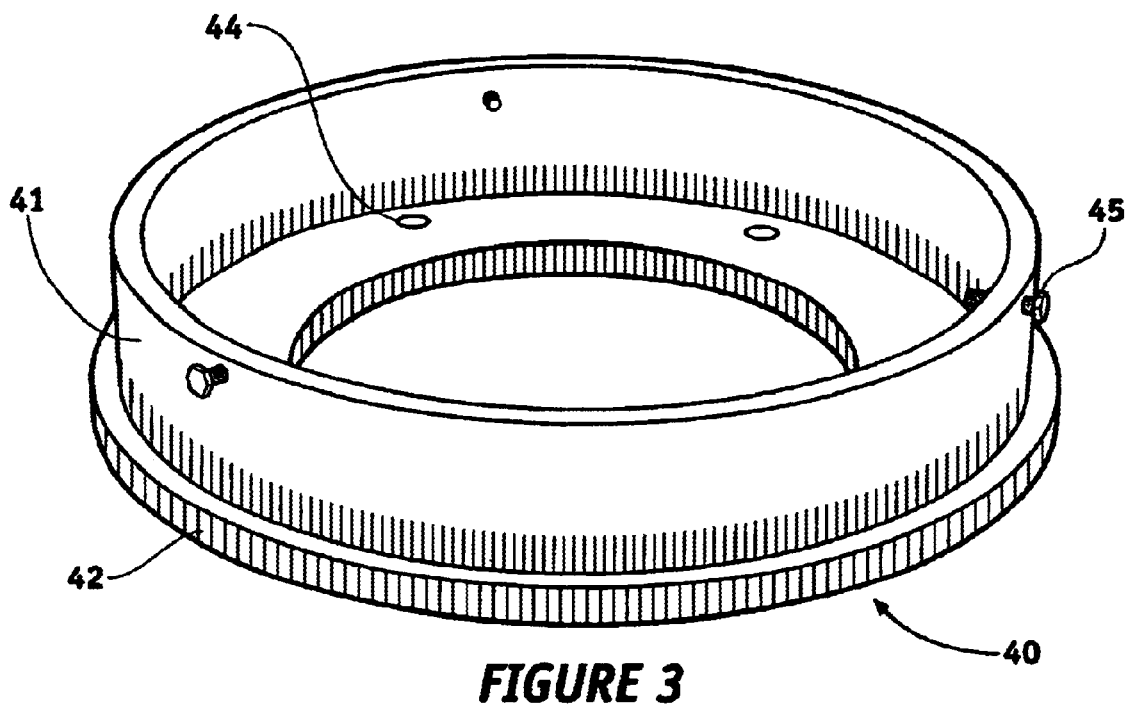
FIG. 3 is a perspective view of a bottom element of the extension apparatus of the present invention.

Turning now to FIGS. 3–8 wherein a presently preferred embodiment of the present invention is shown, FIG. 3 is a perspective view of the bottom portion of the extension apparatus. The bottom portion 40 of the invention is the first portion of a telescoping tube FIG. 8. It has a wall 41 terminating in a flange 42 at the bottom end. The bottom end flange 42 has bolt holes, 44 which register with bolt holes in the flange on the upper end 30 (See FIG. 2) of the in-ground container.

There are a plurality of tapped bores 46 (See FIG. 8) in the wall of the outer tube when the inner telescoping tube is placed on top.

Figure 4:
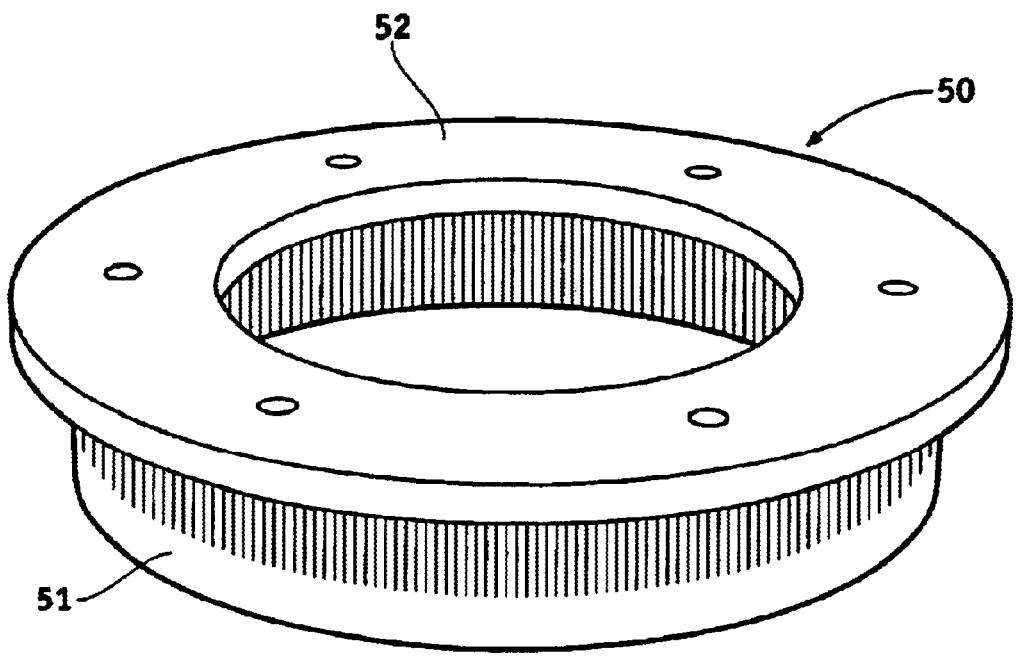
FIG. 4 is a perspective view of the top element of the apparatus of FIG. 3.

Referring now to FIG. 4, a perspective view of the top portion 50 of the invention, which is also the second portion of the telescoping tube. It has a wall 51 terminating in a flange 52 at the top end. The wall 51, when placed over the bottom of the extension apparatus, is inside the circular wall 41 of the bottom portion 40.

Figure 5:
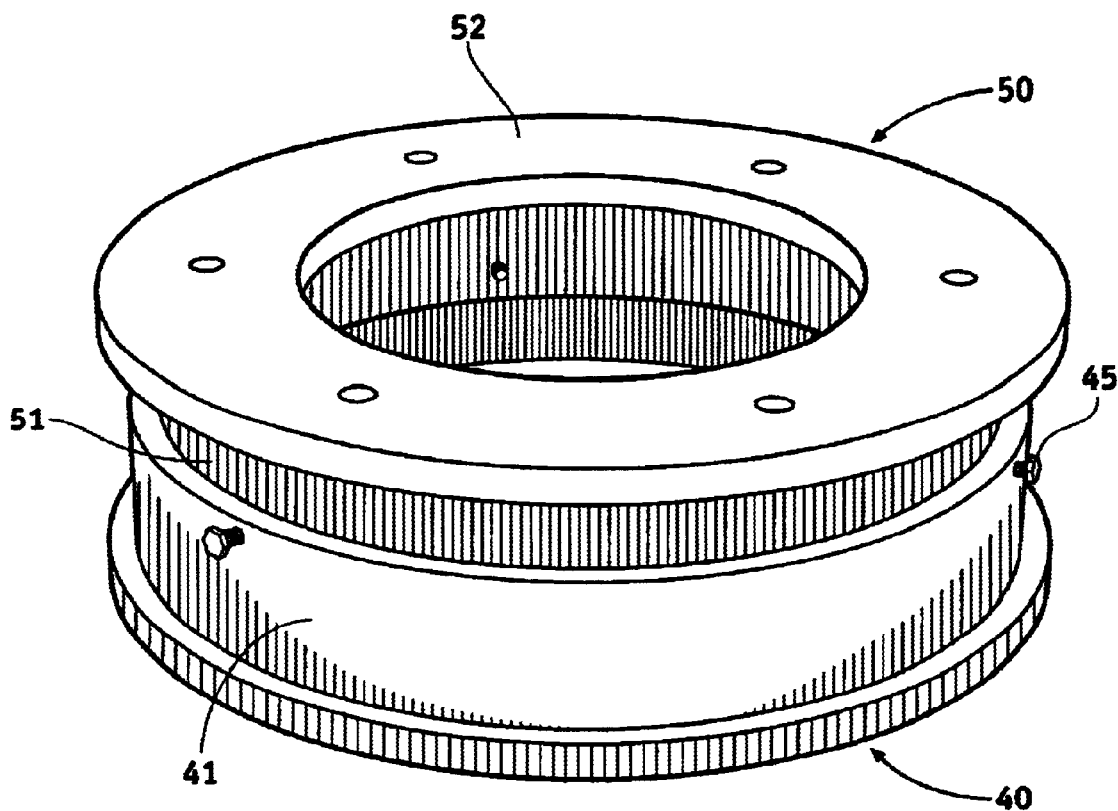
FIG. 5 is a perspective view of the assembled top and bottom sections shown in FIGS. 3 and 4.

Continuing with FIG. 5, this perspective view shows the bottom portion and top portion of the invention placed together to show the unit as a whole. Set screws 45 in said tapped bores are adapted to bear on the wall 51 of said inner tube.

In the method of installing, the extensions elements described above are first provided, then the set screws 45 are tightened to fix the height after manually ascertaining the height with a level and ruler. After the set screws 45 are tightened, a cementitious mixture is applied and set to hold the extension at the proper height.

The grout, concrete, epoxy, or cementitious mixture, after it is poured around the extension of the present invention, holds the extension at the proper height and does not rely on the set screws which are merely to hold the position until the concrete, grout, epoxy, or other cementitious substance has set.

Although the extensions of the present invention are not designed to be load bearing, it may be that a cost analysis and a comparison of the life of the extension of the present invention versus the cost of alternative extensions and the costs of re-installing may justify the use of the present invention in certain load bearing areas, and not just for edge lighting.

The height adjustment feature of this invention makes the apparatus ideal for replacing conventional, existing fixed-length extensions at the time of renovation, i.e., resurfacing of aircraft ground traffic areas, as well as for new installations of such traffic areas, by eliminating the need for installing fixed-length extensions and by eliminating the need for installing several flat spacer rings of various thicknesses. In addition, the installation of alignments adjustments assembly of the present invention saves labor costs, and the assembly is reusable.

It is particularly well suited to use in edge lighting fixtures where the load bearing requirements are not as heavy as the centerline and touchdown zone areas, but useful in other areas as well. By use of this invention, lighter weight apparatus may be used as a simple, easy to manufacture and install alternative to existing apparatus, yielding significant savings and providing a relatively inexpensive alternative to the prior art devices and methods.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing detailed descriptions. Accordingly, this invention is intended to embrace all such alternatives, modifications, and variations which fall within the spirit and scope of the appended claims.

What is claimed is:

1. Apparatus for extending the height of an in-ground airport runway lighting system container having a flange on its upper end for reception of a light fixture, said apparatus comprising:

a. first and second telescoping tubes, each having a wall terminating respectively in a flange at a top end, and a flange at the bottom end of said telescoping tubes; said bottom end flange having bolt holes registering with the flange on the upper end of the in-ground container and said top end adapted to receiving a lighting fixture.

b. a plurality of tapped bores in the wall of said outer tube;

c. a set screw in said tapped bore adapted to bear on said inner tube.

2. The apparatus of claim 1 wherein said lighting system container is a non-load bearing container.

3. The apparatus of claim 1 wherein said lighting system container is load bearing.

4. The apparatus of claim 1 wherein said telescoping tubes are metal.

5. The apparatus of claim 1 wherein said telescoping tubes are non-metalic.

6. The apparatus of claim 1 wherein there are a plurality of set screws in number.

7. A method of extending the height of an in-ground airport runway lighting fixture container having a flange on its upper end for reception of a light fixture, comprising the steps of:

a. providing first and second telescoping tubes, each having a wall terminating respectively in a flange at a top end, and a flange at the bottom end of said telescoping tubes; said bottom end flange having b. bolt holes registering with the flange on the upper end of the in-ground container and said top end adapted to receiving a lighting fixture;

c. providing a plurality of tapped bores in the wall of said outer tube;

d. providing a set screw in said tapped bore adapted to bear on said inner tube;

e. positioning the telescoping tubes at a required height position;

f. tightening the set screws to temporarily preserve the height position;

g. pouring cementitious material around said tubes so positioned at a required height;

h. allowing the cementitious material to set to hold said tubes in place.

8. The method of claim 7 wherein said lighting system container is a non-load bearing container.

9. The method of claim 7 wherein said lighting system container is load bearing.

10. The method of claim 7 wherein said telescoping tubes are metal.

11. The method of claim 7 wherein said telescoping tubes are non-metalic.

12. The method of claim 7 wherein there are a plurality of set screws in number.

13. The method of claim 7 wherein said cementitious material is concrete.

14. The method of claim 7 wherein said cementitious material is grout.

15. The method of claim 7 wherein said cementitious material is epoxy.

* * * * *